(12) United States Patent
Grimm et al.

(10) Patent No.: US 7,008,009 B2
(45) Date of Patent: Mar. 7, 2006

(54) ROLLER BLIND SYSTEM FOR A MOTOR VEHICLE

(75) Inventors: Rainer Grimm, Frankfurt am Main (DE); Thomas Becher, Rodgau (DE); Hubert Bachmann, Dannstadt (DE); Horst Bohm, Frankfurt am Main (DE)

(73) Assignee: ArvinMeritor GmbH, (DE)

( * ) Notice: Subject to any disclaimer, the term of this patent is extended or adjusted under 35 U.S.C. 154(b) by 0 days.

(21) Appl. No.: 10/718,421

(22) Filed: Nov. 20, 2003

(65) Prior Publication Data

US 2004/0113467 A1 Jun. 17, 2004

(30) Foreign Application Priority Data

Dec. 4, 2002 (DE) ................................ 102 56 599

(51) Int. Cl.
*B60J 7/00* (2006.01)
*B60J 3/02* (2006.01)
(52) U.S. Cl. .................. 296/214; 296/219; 160/245; 160/273.1
(58) Field of Classification Search ................ 296/214, 296/219, 141 US, 142 US; 160/243, 245, 160/273.1
See application file for complete search history.

(56) References Cited

U.S. PATENT DOCUMENTS

| | | | | |
|---|---|---|---|---|
| 198,573 A | * | 12/1877 | Copeland | ............. 160/314 |
| 1,718,183 A | * | 6/1929 | Smith | ............. 160/368.1 |
| 4,823,859 A | | 4/1989 | Park | |
| 5,788,317 A | * | 8/1998 | Nation | ............. 296/141 |
| 5,913,564 A | * | 6/1999 | Stewart et al. | ............. 296/172 |
| 6,138,739 A | | 10/2000 | Crider et al. | |
| 6,517,149 B1 | * | 2/2003 | Hirschvogel et al. | ....... 296/214 |
| 6,520,569 B1 | * | 2/2003 | Wingen et al. | ............. 296/214 |
| 2001/0017194 A1 | | 8/2001 | Schlecht | |
| 2002/0069980 A1 | | 6/2002 | Floyd | |
| 2002/0145310 A1 | * | 10/2002 | Schatzler et al. | ........... 296/214 |

FOREIGN PATENT DOCUMENTS

| | | | | |
|---|---|---|---|---|
| CH | 282243 | * | 4/1952 | ............. 296/219 |
| CH | 560833 A5 | | 4/1975 | |
| DE | 501808 | * | 7/1930 | ............. 296/219 |
| DE | 3743366 A1 | | 7/1989 | |
| DE | 9217534 U1 | | 12/1993 | |
| DE | 19745866 C1 | * | 12/1998 | ............. 296/214 |
| DE | 19750713 C1 | | 12/1998 | |
| DE | 19739919 | | 3/1999 | |
| DK | 47108 | * | 3/1933 | ............. 296/219 |
| EP | 625441 | * | 11/1994 | ............. 296/219 |
| GB | 341858 | * | 1/1931 | ............. 296/219 |
| GB | 945571 | * | 1/1964 | ............. 296/219 |
| JP | 29455 | * | 2/1987 | ............. 296/214 |

OTHER PUBLICATIONS

Search report, Austrian Patent Office, dated Jan. 22, 2003.

* cited by examiner

*Primary Examiner*—Dennis H. Pedder
(74) *Attorney, Agent, or Firm*—Carlson, Gaskey & Olds

(57) ABSTRACT

A roller blind system for a vehicle roof includes a rotatable coiling body and a roller blind that is attached at one end to the coiling body and at the other end to a vehicle portion in a stationary manner. The coiling body is shiftable in a translational motion, allowing the roller blind to uncoil and coil up while minimizing frictional forces on the roller blind.

3 Claims, 3 Drawing Sheets

US 7,008,009 B2

ROLLER BLIND SYSTEM FOR A MOTOR VEHICLE

REFERENCE TO RELATED APPLICATIONS

The present invention claims the benefit of German Patent Application No. 102 56 599.6, filed Dec. 4, 2002.

TECHNICAL FIELD

The invention relates to a roller blind system, in particular for a motor vehicle, comprising a coiling body that is rotatable and a roller blind that is attached at one end to the coiling body.

BACKGROUND OF THE INVENTION

Various designs of roller blind systems for vehicles are known. German Published Patent Application 197 39 919, for example, discloses a roller blind system in which a coiling body is mounted at an edge of an opening in a vehicle roof. The roller blind may be withdrawn from the coiling body so that the roller blind extends across the area of the opening to constitute a sunshade in this area. The roller blind is laterally guided by a pair of guide rails into which the longitudinal edges of the roller blind are inserted when the blind is withdrawn from the coiling body.

The disadvantage of this structure is that the forces for actuating the roller blind rise super-proportionally when the blind is withdrawn from the coiling body. First, there is in fact an increase in a retracting force that is exerted on the coiling body by a retracting spring. Additionally, a frictional force is produced by friction between the edges of the roller blind and the guide rails and increases as the withdrawal length of the roller blind increases.

One object of the invention to further develop a roller blind of the type mentioned above that reduces the increase in the actuating forces as an increasing amount of the roller blind is withdrawn.

SUMMARY OF THE INVENTION

Accordingly, one embodiment of the invention is directed to a roller blind system having one end secured to a coiling body and its opposite end mounted to the vehicle so that it is stationary. The coiling body is adapted to be shifted by a translational motion. This roller blind system is based on the fundamental concept that the friction between the guide rails and the roller blind occurring in prior art systems can be avoided by having the coiling body perform a translational motion. As a result, the roller blind remains stationary and is uncoiled across the area which it is intended to cover. This uncoiling is conducted instead of withdrawing the roller blind from the coiling body, which would result in an even longer area of the roller blind needing to be shifted.

In accordance with one embodiment of the invention, the system may include two guide rails that releasably connect two longitudinal edges of the roller blind. This allows the guide rails to receive the roller blind firmly at its edges in a manner similar to that known in the prior art, with the roller blind in the roller blind system according to the invention being stationarily connected with the guide rail at a multitude of points when the coiling body is moved in relation to the guide rail. In a particularly simple embodiment, the guide rail and the associated longitudinal edge of the roller blind are provided with two mating parts of a VELCRO® fastener. This allows stationary attachment of the roller blind to the two guide rails when the coiling body is moved along the guide rails.

According to one embodiment of the invention, each longitudinal edge of the roller blind has a detent part that may be connected with a counterpart fitted to or integrated into the guide rail. The longitudinal edges of the roller blind are thus fitted to the guide rails with an interlocking fit when the coiling body moves along the guide rails.

The two guide rails may be configured so they are parallel to each other to accommodate a rectangular roller blind. It is further possible for the two guide rails to be disposed at a variable distance from each other and for the roller blind to have a variable width such that the two longitudinal edges of the roller blind follow the course of the guide rails. In this arrangement, the guide rails may extend in a straight line while being inclined with respect to each other or they each may be curved.

BRIEF DESCRIPTION OF THE DRAWINGS

The invention will now be described with reference to different embodiments illustrated in the accompanying drawings in which.

DETAILED DESCRIPTION OF THE EMBODIMENTS

Figure 1:
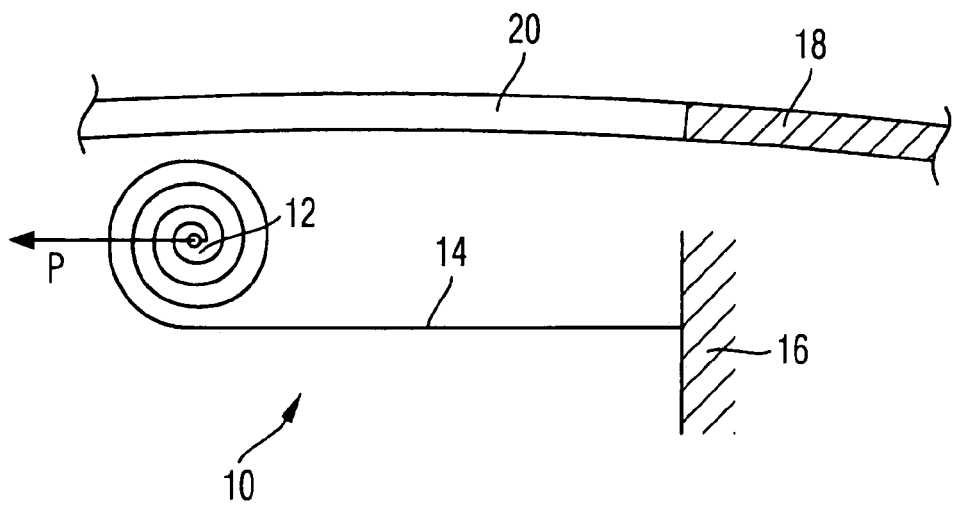
FIG. 1 shows a schematic diagram of a roller blind system in accordance with a first embodiment of the invention.

FIG. 1 diagrammatically shows a roller blind system 10 having a coiling body 12 and a roller blind 14. One end of the roller blind 14 is firmly secured to the coiling body 12 while the opposite end is mounted to the vehicle to be stationary. This stationary mounting surface is symbolized in FIG. 1 by a vehicle portion 16. The roller blind system 10 is fitted below a roof 18 of a motor vehicle having a roof opening 20. The roof opening 20 may be closed by a cover (not shown) of a sliding roof system.

The coiling body 12 is usually accommodated within a cartridge (not shown) and may be shifted below the roof opening 20 by a translational motion. When the coiling body 12 is shifted to the left in the direction of the arrow P shown in FIG. 1, the roller blind 14 extends beneath the roof opening 20 to form a sunshade.

Figure 2:
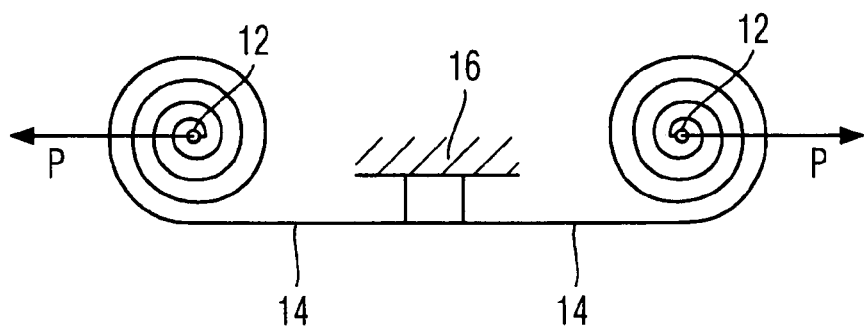
FIG. 2 shows a schematic diagram of a roller blind system in accordance with a second embodiment of the invention.

FIG. 2 shows a roller blind system having two coiling bodies 12. One roller blind 14 is received on each coiling body 12, and the two roller blinds 14 are connected to each other. In this example, the two roller blinds 14 are fixedly secured to the vehicle portion 16 at the juncture between the two blinds 14. The two coiling bodies 12 may be shifted in opposite directions to each other so that, for instance, a front roof opening and a rear roof opening of a vehicle roof may be respectively covered by the two roller blinds.

Figure 3:
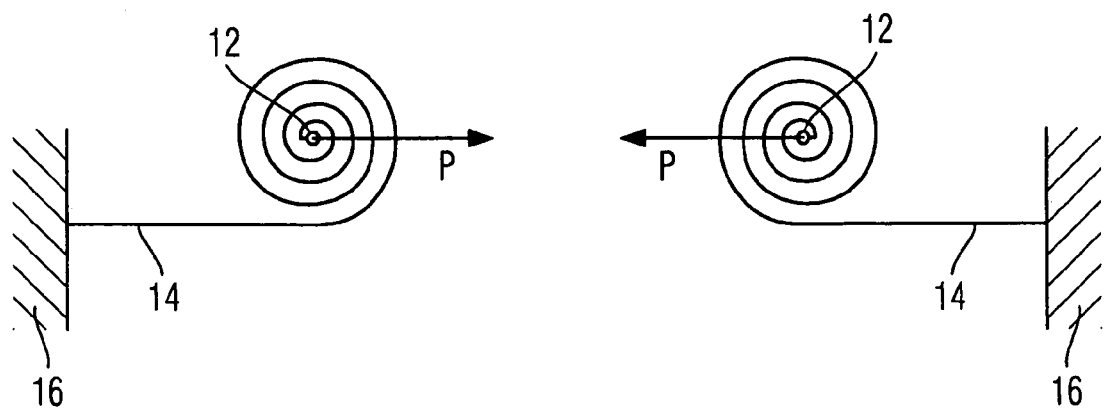
FIG. 3 shows a schematic diagram of a roller blind system in accordance with a third embodiment of the invention.

FIG. 3 shows a roller blind system which, similar to the roller blind system shown in FIG. 2, comprises two roller blinds 14 that are received on two coiling bodies 12. Unlike the roller blind system of FIG. 2, the roller blind system of FIG. 3 does not connect the two roller blinds with each other. Instead, the two roller blinds 14 are respectively connected to two opposing vehicle portions 16. The two opposing coiling bodies 12 may be brought together toward the center so that, for instance, a front and a rear roof opening may be respectively covered by the two roller blinds.

Figure 4:
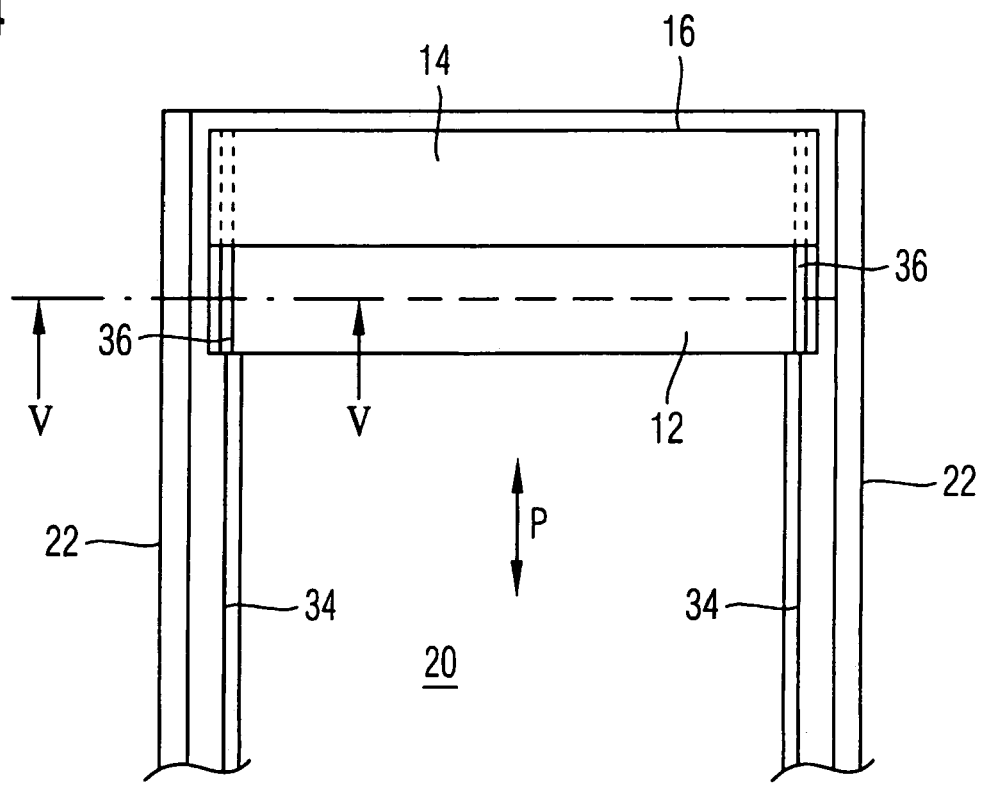
FIG. 4 shows a diagrammatic top view of a roller blind system in accordance with the first embodiment.
Figure 5:
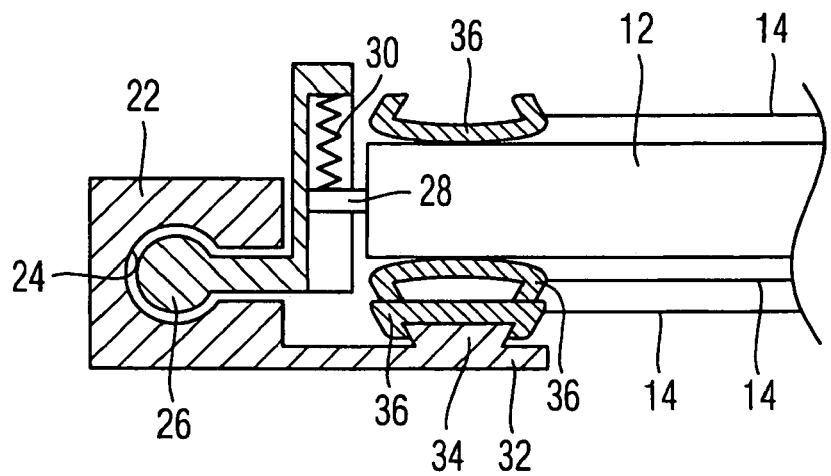
FIG. 5 shows the section V—V of FIG. 4 on an enlarged scale.

FIGS. 4 and 5 show a roller blind system corresponding to the structure illustrated in FIG. 1. Like reference numerals are used for like components described with respect to FIG. 1, and in this respect reference is made to the foregoing discussions.

The roller blind system includes two guide rails 22 that extend along the longitudinal edges of the roof opening 20. At the top end in FIG. 4, the two guide rails 22 are connected by a crosspiece, which corresponds to the stationary vehicle portion 16 described above, where one end of the roller blind 14 is fastened.

Each guide rail 22 has a guide groove 24 (FIG. 5) in which a sliding carriage 26 is guided. An arbor 28 of the coiling body 12 is received in the sliding carriage 26. A pretensioning spring 30 connected to the arbor 28 urges the coiling body 12 toward a base section 32 of the guide rail 22. The base section 32 has a counterpart, such as a detent web 34, formed thereon and having a dovetailed cross-section.

The roller blind 14 is received on the coiling body 12, with two thicknesses thereof being shown in this arrangement. Each longitudinal edge of the roller blind 14 is provided with a clip 36 (FIG. 5), which may be made of plastic and has an inside cross-section shaped to be complementary to the dovetailed cross-section of the detent web 34. The roller blind 14 may be molded into the clip 36, for example. The material of the clip 36 is flexible so that the roller blind, along with the two clips, may be received at its longitudinal edges on the coiling body 12.

When the coiling body is shifted downward in regard to FIG. 4 and along the guide rails 22, the roller blind 14 is uncoiled from the coiling body 12 which, assisted by the pretensioning spring 30, presses the clip 36 onto the detent web 34 so that the clip 36 is gradually locked into place on the detent web 34 with an interlocking fit. This results in reliable lateral guidance of the roller blind 14 in the area between the coiling body 12 and the vehicle portion 16.

Note that any other suitable detent mechanism may be used instead of the interlocking clip 36 and detent web 34. The detent mechanism may be any mechanism made up of a detent part and a counterpart adapted to be releasably connected with each other when the coiling body is moved along the two guide rails 22 without departing from the scope of the invention.

Figure 6:
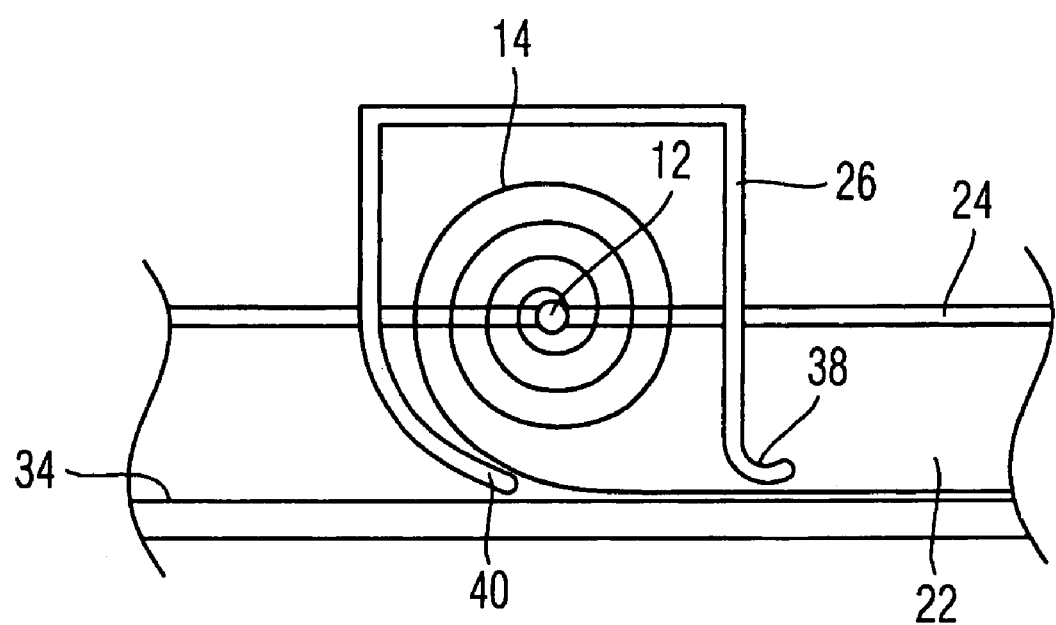
FIG. 6 shows a diagrammatic sectional view of a variant of a roller blind system in accordance with the first embodiment.

FIG. 6 illustrates another embodiment that differs from the embodiment shown in FIGS. 4 and 5 with respect to the way the roller blind 14 is connected with, and released again from, the guide rail.

In this embodiment, the coiling body 12 is mounted on the sliding carriage 26 to be non-displaceable. In this embodiment, the sliding carriage 26 is a cartridge having the roller blind 14 received therein and includes a pressure slider 38 that is elastically pretensioned so that it rests on the detent web 34 with a certain degree of pretension. The roller blind 14 or the clip 36 in this embodiment may be located between the pressure slider 38 and the detent web 34. The sliding carriage 26 further includes a release slider 40 arranged between the roller blind 14 or the clip 36 fitted thereto and the detent web 34. The roller blind 14 accordingly exits the cartridge between the pressure slider 38 and the release slider 40.

When the sliding carriage 26 is shifted such that the roller blind 14 is withdrawn from the sliding cartridge 26, the pressure slider 38 presses the clip 36 onto the detent web 34 so that it is locked in place. When the sliding carriage 26 is shifted in the opposite direction so that the roller blind 14 is received on the coiling body 12, the release slider 40 will move between the clip 36 and the detent web 34 so that the roller blind 14 is released from the guide rail 22 to be coiled up.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A roller blind system for a motor vehicle, comprising:
   a rotatable coiling body that is shiftable by a translational motion;
   a roller blind attached at a first end to the rotatable coiling body and fixedly mounted at a second end to a vehicle portion;
   two guide rails that guide two longitudinal edges of the roller blind wherein the two longitudinal edges are releasably connected to the two guide rails; and
   a cartridge that receives the roller blind, the cartridge having a pressure slider that locks the roller blind with the two guide rails and a release slider that releases the roller blind from the two guide rails.

2. A vehicle roof assembly, comprising:
   a vehicle roof having a roof opening;
   a rotatable coiling body that is shiftable by a translational motion in a vicinity of the roof opening;
   a roller blind attached at a first end to the rotatable coiling body and fixedly mounted at a second end to a vehicle portion, wherein the roller blind is moveable to open and close the roof opening;
   two guide rails that guide the rotatable coiling body and two longitudinal edges of the roller blind;
   a detent part disposed on each longitudinal edge of the roller blind;
   a counterpart that is complementary to each detent part and fitted to each of the two guide rails such that the detent parts connect with the counterparts when the rotatable coiling body is shifted; and
   a pretensioning mechanism that urges the rotatable coiling body against the counterparts.

3. A vehicle roof assembly, comprising:
   a vehicle roof having a roof opening;
   a rotatable coiling body that is shiftable by a translational motion in a vicinity of the roof opening;
   a roller blind attached at a first end to the rotatable coiling body and fixedly mounted at a second end to a vehicle portion, wherein the roller blind is moveable to open and close the roof opening;
   two guide rails that guide the rotatable coiling body and two longitudinal edges of the roller blind; and
   a cartridge that receives the roller blind, the cartridge having a pressure slider that locks the roller blind with the two guide rails and a release slider that releases the roller blind from the two guide rails.

* * * * *